July 16, 1940.   M. DELLEANI   2,208,180

REINFORCED VALVE BODY

Filed May 16, 1938

Inventor:
M. Delleani
By Glascock Downing & Seebold
Attorneys

Patented July 16, 1940

2,208,180

UNITED STATES PATENT OFFICE 2,208,180

REINFORCED VALVE BODY

Maurizio Delleani, Genoa, Italy

Application May 16, 1938, Serial No. 208,268
In Italy May 21, 1937

2 Claims. (Cl. 251—155)

The present invention relates to valves and more particularly pertains to means for reinforcing such devices.

The bodies of the valves and cocks in general are subjected to the pressure of the internal fluid and to mechanical stresses which cause deformations in the material constituting the body. Such deformation occurs in any valve body and more particularly, in those bodies which do not present spherical or ellipsoidal conformations, and in those bodies of valves or the like which are constituted of particularly yielding material.

The deformations cause displacements of the seat or seats of the valve producing losses of tightness and the necessity of adjustments for the closing element with respect to the seat. Such adjustments while establishing good sealing conditions provide a condition wherein it is necessary to exert excessive forces upon the elements for the operation of the sealing members to remove the same from the respective seats when it is desired to open the valve.

The present invention eliminates the inconveniences mentioned above by the provision of stiffening elements for the body of the valve or the like constructed without ribs, such stiffening elements being mounted externally of the body itself and designed and intended to eliminate or at least to cut down the displacements which occur in the body of the valve at points or parts so as to influence the position of the seat of the valve or equivalent element.

A further characteristic of the present invention resides in the fact that the reinforcing elements are so arranged that they prevent displacements of the valve seats, and permit variation of form due to increases in temperature of the fluid contained inside the body of the valve or the like.

The accompany drawing illustrates, by way of example only, a form of the invention applied to a slide valve.

Figure 3:
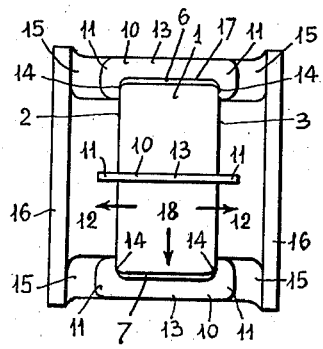
Figure 1:
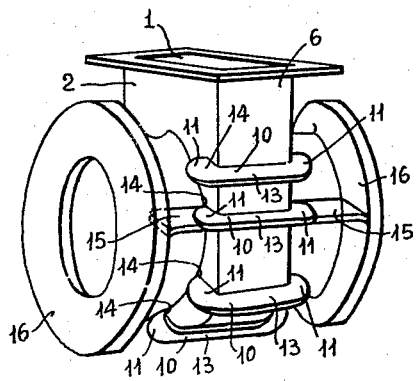
Figure 2:
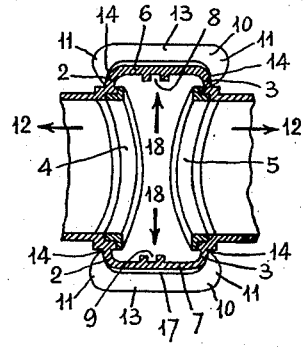

Fig. 1 shows the body of the valve in external perspective view, Fig. 2 is a horizontal axial section thereof and Fig. 3 is a bottom view of the valve body taken in the direction of the arrow III, of Fig. 1.

Referring more particularly to the embodiment illustrated, it will be seen that the body 1 of the slide valve is provided with a rectangular housing having smooth faces 2 and 3 which serve to support, at the interior, the seats 4 and 5 for the gate or sliding member of the valve. The other smooth walls 6 and 7 serve to present, at the interior, the guides 8 and 9 for the gate.

In accordance with the invention, C-shaped stiffening elements 10 are applied and suitably distributed at the outside along the periphery of the body 1, the ends or heads 11 of which elements engage with the walls 2 and 3 thus preventing or at least limiting to an admissible minimum the displacements that such walls may accomplish in the direction of the arrows 12. The stiffening elements 10 are each provided with an intermediate portion 13 included between the heads 11, which portion is not in contact with the walls 6 and 7 of the valve body, and they preferably have a flattened shape so that such portion 13 will present a large outwardly radiating surface. The internal edge 17 of the portion 13 will thus be spaced from the opposite surface of the wall of the valve body in order to allow the walls 6 and 7 to expand in the direction of the arrows 18.

The stiffening elements 10 may be shrunk or hot fitted on the body 1 and they may be welded to it at 14, that is at the point where they engage the walls 2 and 3. As will be seen from Figs. 1 and 3, one or more of the stiffening elements 10 may be prolonged beyond the extent necessary for the purpose indicated above, by means of extensions 15 reaching other elements of the valve body, such as for instance, the flanges 16 to which they may be welded. In this manner the stress which must be undergone by the stiffening elements will partially be supported by the other elements of the body of the valve, slide valve or the like and consequently the stiffening elements may be made thinner.

Though for descriptive reasons the present invention has been based upon the foregoing and the accompanying drawing, many practical modifications may be adopted in carrying the invention itself into practice and such changes may be made without departing from the basic ideas of the invention as set forth in the following claims.

Having particularly described and ascertained the nature of the present invention and in what manner the same is to be performed, I declare that what I claim is:

1. In a valve, a valve body having an opening for the passage of liquid therethrough, a valve seat adapted to be engaged by a slide valve member for closing said opening, a housing carried by the body in which the slide valve member may be retracted from said opening, said housing having grooves for guiding said slide valve member, a reinforcing element extending across the housing adjacent the valve seat in the direction in which liquid may move through the body, and said reinforcing element being attached at the ends thereof to end walls of the housing and spaced from the side wall of the housing so as to prevent displacement of the valve seat with respect to the valve slide.

2. In a valve, a valve body having an opening for the passage of liquid therethrough, a valve seat adapted to be engaged by a slide valve member for closing said opening, a housing carried by the body in which the slide valve member may be retracted from said opening, said housing having grooves for guiding said slide valve member, C-shaped reinforcing members extending across the housing adjacent the valve seat in the direction in which liquid may move through the valve body, the ends of said reinforcing members engaging end walls of said housing so as to prevent displacement of the valve seat with respect to the valve slide, and portions of said C-shaped members intermediate said ends being spaced from the side walls of the housing.

MAURIZIO DELLEANI.